(12) United States Patent
Vanden Boer

(10) Patent No.: US 10,875,475 B2
(45) Date of Patent: Dec. 29, 2020

(54) VEHICLE WINDOW POST ASSEMBLY

(71) Applicant: ALLIMEX, Heusden-Zolder (BE)

(72) Inventor: Danny Vanden Boer, Lommel (BE)

(73) Assignee: ALLIMEX, Heusden-Zolder (BE)

( * ) Notice: Subject to any disclaimer, the term of this patent is extended or adjusted under 35 U.S.C. 154(b) by 104 days.

(21) Appl. No.: 16/329,177

(22) PCT Filed: Sep. 2, 2016

(86) PCT No.: PCT/EP2016/070783
§ 371 (c)(1),
(2) Date: Feb. 27, 2019

(87) PCT Pub. No.: WO2018/041367
PCT Pub. Date: Mar. 8, 2018

(65) Prior Publication Data
US 2019/0184914 A1   Jun. 20, 2019

(51) Int. Cl.
*B60R 13/04* (2006.01)
*B60R 13/06* (2006.01)
*B60R 13/02* (2006.01)

(52) U.S. Cl.
CPC .............. *B60R 13/04* (2013.01); *B60R 13/06* (2013.01); *B60R 2013/0293* (2013.01)

(58) Field of Classification Search
CPC ....... B60R 13/04; B60R 13/06; B60R 13/025; B60R 2013/0293; B62D 25/04
USPC ........................................... 296/1.08, 193.06
See application file for complete search history.

(56) References Cited

U.S. PATENT DOCUMENTS

| | | | | |
|---|---|---|---|---|
| 4,592,937 A | * | 6/1986 | Nagata | B60R 13/04 293/1 |
| 5,353,571 A | * | 10/1994 | Berdan | B60R 13/04 24/293 |
| 8,919,846 B2 | * | 12/2014 | Maass | B60J 10/76 296/1.08 |
| 9,403,492 B1 | * | 8/2016 | Greggs | B62D 29/043 |
| 2004/0043041 A1 | * | 3/2004 | Baker, Jr. | A61K 45/06 424/400 |

(Continued)

FOREIGN PATENT DOCUMENTS

| | | |
|---|---|---|
| DE | 41 02 302 A1 | 7/1992 |
| FR | 2 899 521 A1 | 10/2007 |
| WO | 2005/102781 A1 | 11/2005 |

OTHER PUBLICATIONS

International Search Report dated May 15, 2017, issued in corresponding International Application No. PCT/EP2016/070783, filed Sep. 2, 2016, 2 pages.

*Primary Examiner* — Gregory A Blankenship
(74) *Attorney, Agent, or Firm* — Christensen O'Connor Johnson Kindness PLLC

(57) ABSTRACT

Vehicle window post assembly, in particular a windscreen post assembly, comprising a base part arranged to be fixed to a vehicle chassis along a side of a window of the vehicle, and a cover part arranged to be fixed to the base part and in use covering the base part. A sealing strip is provided for sealing a gap between the side of the window and the cover part. The sealing strip is provided on a mounting part which is a separate part from the base and cover parts, and the cover part and the mounting part are together provided with complementary fixing elements by means of which the mounting part is mountable on the cover part in a position suitable for sealing the gap.

13 Claims, 8 Drawing Sheets

(56) References Cited

U.S. PATENT DOCUMENTS

| | | | | |
|---|---|---|---|---|
| 2009/0267373 A1* | 10/2009 | Gerndorf | ............... | B60R 13/02 296/1.08 |
| 2010/0060037 A1* | 3/2010 | Terai | ...................... | B60R 13/04 296/193.06 |
| 2010/0064591 A1* | 3/2010 | Iwabuchi | ............... | B60R 13/04 49/499.1 |
| 2011/0126473 A1* | 6/2011 | Prater | ..................... | B60J 10/76 49/484.1 |
| 2012/0001445 A1* | 1/2012 | Hajiri | ................. | B60R 13/0206 296/1.08 |
| 2014/0084631 A1* | 3/2014 | Kojima | ................. | B62D 25/04 296/193.06 |
| 2014/0373475 A1* | 12/2014 | Muskovac | .............. | B60R 13/04 52/468 |
| 2018/0170161 A1* | 6/2018 | Makita | ..................... | B60J 10/75 |
| 2019/0184914 A1* | 6/2019 | Vanden Boer | .......... | B60R 13/04 |
| 2019/0256154 A1* | 8/2019 | Kamimura | ............ | B62D 25/04 |
| 2020/0130610 A1* | 4/2020 | Fujiki | .................... | B60R 13/04 |
| 2020/0139919 A1* | 5/2020 | Beltran | ................ | B60R 21/213 |
| 2020/0255075 A1* | 8/2020 | Baron | .................... | B60R 13/04 |

* cited by examiner

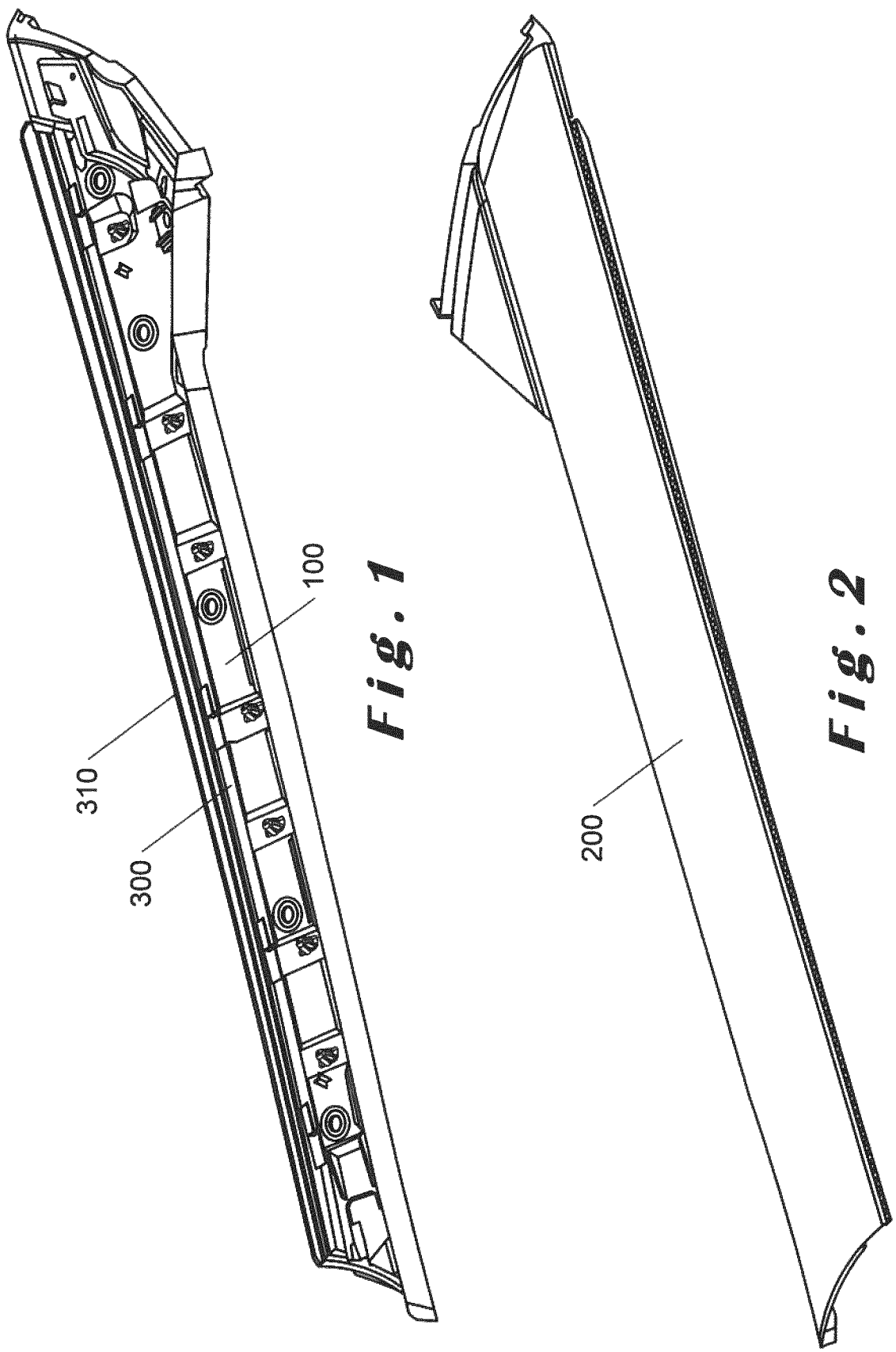

VEHICLE WINDOW POST ASSEMBLY

TECHNICAL FIELD

The present invention relates to a vehicle window post assembly, in particular a windscreen post assembly.

BACKGROUND ART

It is known to provide window posts with sealing members around the windows of vehicles, to protect the interior of the vehicle against weather conditions. The window posts commonly comprise cover parts or finishing parts, for covering the constructional parts around the windows and achieving an aesthetically pleasing appearance on the outside of the vehicle. One example are the side posts which are provided on either lateral side of the windscreen.

It has been found that for some existing assemblies there is a risk that the cover part is released from the base part as a result of wind catching in a gap that may exist between the window and the cover part. This is especially the case for the side posts at the windscreen.

There is thus a need for an improved assembly with which the risk that the cover part is accidentally released can be reduced.

DISCLOSURE OF THE INVENTION

It is an aim of this invention to provide a vehicle window post assembly, in particular a windscreen post assembly, with which the risk that the cover part is accidentally released can be reduced.

This aim is achieved with the vehicle window post assembly according to the first claim.

The invention provides, in a first aspect, a vehicle window post assembly, in particular a windscreen post assembly, comprising a base part arranged to be fixed to a vehicle chassis along a side of a window of the vehicle, and a cover part arranged to be fixed to the base part and in use covering the base part. A sealing strip is provided for sealing a gap between the side of the window and the cover part. According to the first aspect of the invention, the sealing strip is provided on a mounting part which is a separate part from the base and cover parts, and the cover part and the mounting part are together provided with complementary fixing elements by means of which the mounting part is mountable on the cover part in a position suitable for sealing the gap.

In the prior art assemblies showing the problem described above, the sealing strip is provided as a part which is fixed to or moulded onto the base part. The sealing strip is not moulded onto the cover part because the step of moulding the strip onto the cover part in the injection moulding process could cause damage, or at least an unpleasant appearance of part of the exterior surface of the cover part, which is undesirable.

An analysis of the problem of prior art assemblies has shown that, as a result of the sealing strip being fixed to or moulded onto the base part, a gap may still be present between the sealing strip and the cover part, in which wind can catch and cause the cover part to be released from the base part.

According to the first aspect of the invention, the sealing strip is provided on a separate mounting part which is fixed to the cover part. As a result, it can be avoided that a gap remains between the sealing strip and the cover part, or at least this gap can be minimised, and the risk that the cover part is blown off can be strongly reduced.

In embodiments according to the present invention, the complementary fixing elements, by means of which the mounting part is mounted on the cover part, are formed by an array of fixing elements distributed along the length of the mounting and cover parts. The distribution along the length of the mounting and cover parts has the effect that the sealing of the gap can be better ensured.

In embodiments according to the present invention, the complementary fixing elements, by means of which the mounting part is mounted on the cover part, are sliding fixing elements which are fixable to each other by a sliding movement of the mounting part with respect to the cover part in longitudinal direction, or substantially in longitudinal direction, of the mounting and cover parts. Thereto, the sliding fixing elements preferably comprise complementary ridges, oriented for enabling the sliding movement while engaging behind each other in a direction perpendicular thereto to ensure the fixation. The fixation by the sliding movement in the longitudinal direction has the effect that a stronger fixation can be obtained, for example as a result of the ridges engaging behind each other.

In embodiments according to the present invention, the mounting part and the cover part may together be provided with interlocking elements for securing the fixation of the mounting part to the cover part. The interlocking elements may for example be provided by a resilient member on one part among the mounting part and the cover part and a protrusion on the other part among the mounting part and the cover part, wherein the resilient member is resiliently pushed away by the protrusion upon fixing the mounting part to the cover part until it snaps back into an engaging position in which the resilient member engages behind the protrusion and secures the position of the mounting part on the cover part.

In embodiments according to the invention, the sealing strip is moulded onto the mounting part. This means that the sealing strip and the mounting part are integrally formed in an injection moulding process, wherein the mounting part is formed in a first moulding step and the sealing strip is formed in a second step onto the mounting part, i.e. while the latter is present in the mould used for the injection moulding process. Both parts may be formed from plastic materials, the mounting part being preferably formed from a harder material than the sealing strip. In this way, these parts may be optimised for their respective function, namely the mounting part for the function of fixing the sealing strip to the cover part and the sealing strip for the function of sealing the gap between the window and the cover part. The moulded-on sealing strip has the advantage that the manufacturing process can be simplified, since the need for an adhesive or other means for attaching the sealing strip to the mounting part can be avoided.

The invention provides, in a second aspect, which may be combined with the first aspect described above though not necessarily, a vehicle window post assembly, in particular a windscreen post assembly, comprising a base part arranged to be fixed to a vehicle chassis along a side of a window of the vehicle, and a cover part arranged to be fixed to the base part and in use covering the base part. A sealing strip is provided for sealing a gap between the side of the window and the cover part. According to the second aspect of the invention, the sealing strip is provided on a mounting part which is fixed to or attached to the cover part (i.e. by means of fixing elements and/or adhesive). Further, the assembly comprises a first array of first resilient fixing elements which in assembled state provide for an engagement between the cover part and the base part and a second array of second resilient fixing elements which in assembled state provide for an engagement between the mounting part and the base part.

This means that the first resilient fixing elements engage parts of the cover part and/or the base part to effect a fixation of these parts onto each other and thereby effect a fixation of the cover part to the base part and that the second resilient fixing elements engage parts of the mounting part and/or the base part to effect a further fixation of the mounting part (and the sealing strip provided thereon) to the base part.

As a result, the second resilient fixing elements provide for a direct engagement between the base part and the mounting part, so that the sealing strip is held tightly to the base part. Additionally, this tight fixation of the sealing strip to the base part can be used to increase the pressure with which the sealing strip is pushed onto the edge of the window, i.e. to obtain a better seal and reduce the risk of any gap between the window and the sealing strip. The tight fixation thus generally may reduce the risk that wind can catch underneath the sealing strip and that as a result the cover part would be blown off.

In embodiments according to the present invention, the first array of first resilient fixing elements, by means of which the cover part is fixed to the base part, are distributed along the length of the base and cover parts. The distribution along the length of the base and cover parts has the effect that the fixation can be better ensured and that the risk that the cover part is blown off can be further reduced.

In embodiments according to the present invention, the second array of second resilient fixing elements, by means of which the mounting part (and the sealing strip provided thereon) is fixed to the base part, are distributed along the length of the base and mounting parts. The distribution along the length of the base and mounting parts has the effect that the sealing function of the sealing strip can be better ensured and that the risk that the cover part (to which the sealing strip is fixed or attached) is blown off can be further reduced.

In embodiments according to the present invention, the first resilient fixing elements are separate construction parts which are, before assembly, provided on the cover part and have resilient wings for engaging behind parts of the base part. The provision of such separate resilient fixing elements has the effect that these parts can be optimised for their function and/or be interchanged with other first resilient fixing elements with different properties as desired. Further, providing these elements as separate construction parts has the advantage that the manufacturing process of the cover part and the base part by injection moulding can be simplified.

In embodiments according to the invention, the cover part comprises an array of structures for receiving the first resilient fixing elements and the base part comprises an array of holes through which the resilient wings of the first resilient fixing elements are inserted in assembled state.

In embodiments according to the invention, the second resilient fixing elements comprise resilient hook-shaped members on one part among the mounting part and the base part and complementary ridges on the other part among the mounting part and the base part, wherein the hook-shaped members engage behind the complementary ridges in assembled state.

BRIEF DESCRIPTION OF THE DRAWINGS

The invention will be further elucidated by means of the following description and the appended drawings.

FIGS. 1 and 2 show perspective views of an embodiment of a windscreen post assembly according to the invention.

MODES FOR CARRYING OUT THE INVENTION

Figure 3:
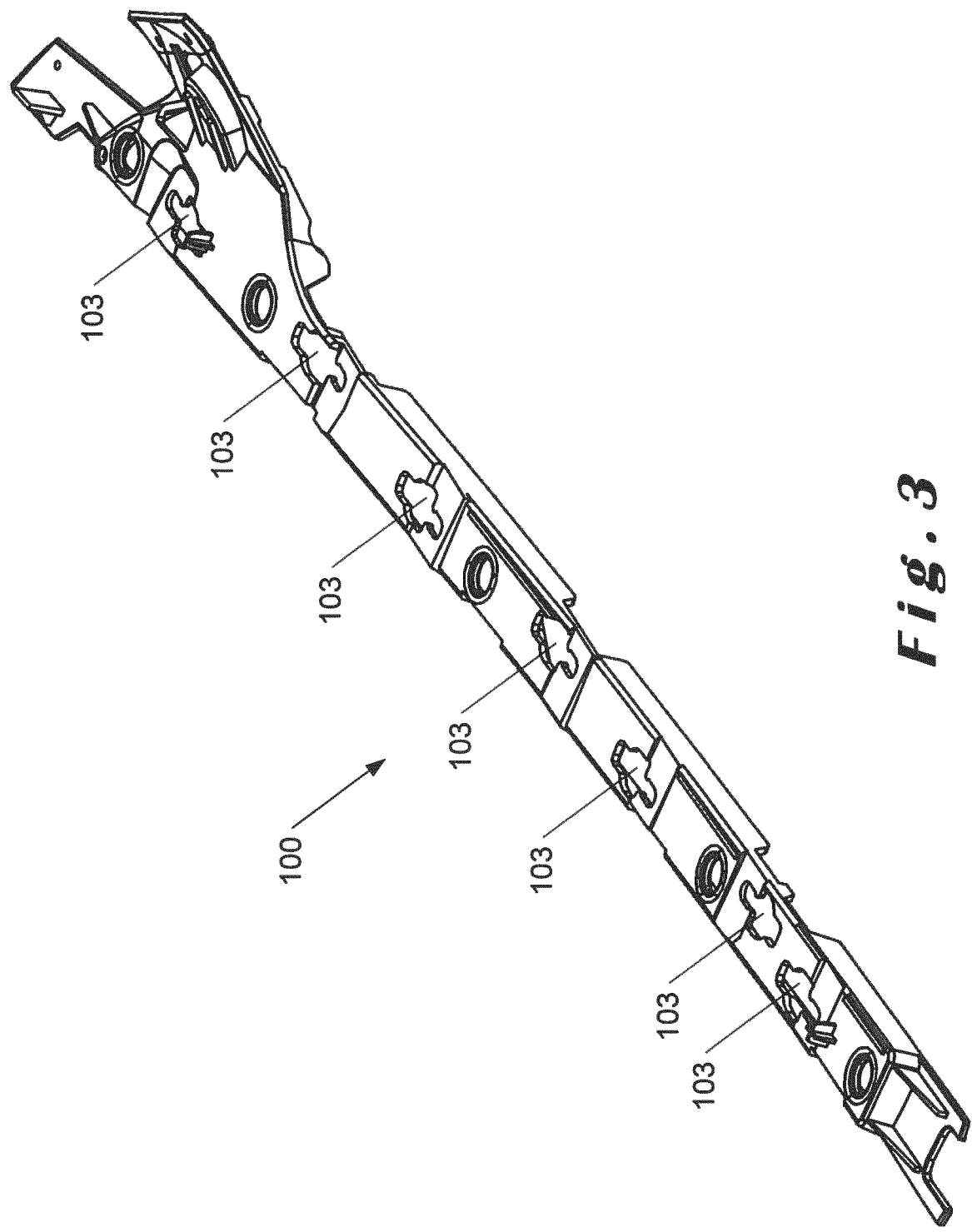
FIG. 3 shows a perspective view of the base part of the assembly of FIGS. 1 and 2.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

FIGS. 1 and 2 show perspective views of an embodiment of a windscreen post assembly, comprising a base part 100, arranged to be fixed to a vehicle chassis along a side of a window of the vehicle, a cover part 200, arranged to be fixed to the base part, and a mounting part 300 with a sealing strip 310 which is fixed to the cover part 200 and is provided for sealing a gap between the side of the window and the cover part. The mounting part 300 is a separate construction part and is fixed to the cover part 200 by means of complementary fixing elements, in particular sliding fixing elements 201, 301, which are provided as integral parts on respectively the cover part and the mounting part.

FIG. 3 shows a perspective view of the base part 100 which is in use fixed to the vehicle chassis. This fixation to the vehicle chassis occurs by means of conventional fixing means and will therefore not be discussed further herein.

The base part 100 comprises a number of holes 103 which are longitudinally distributed, i.e. distributed along the length of the base part, and are provided for receiving resilient wings 403 of the first resilient fixing elements 400 by means of which the cover part 200 is fixed to the base part 100.

Figure 11:
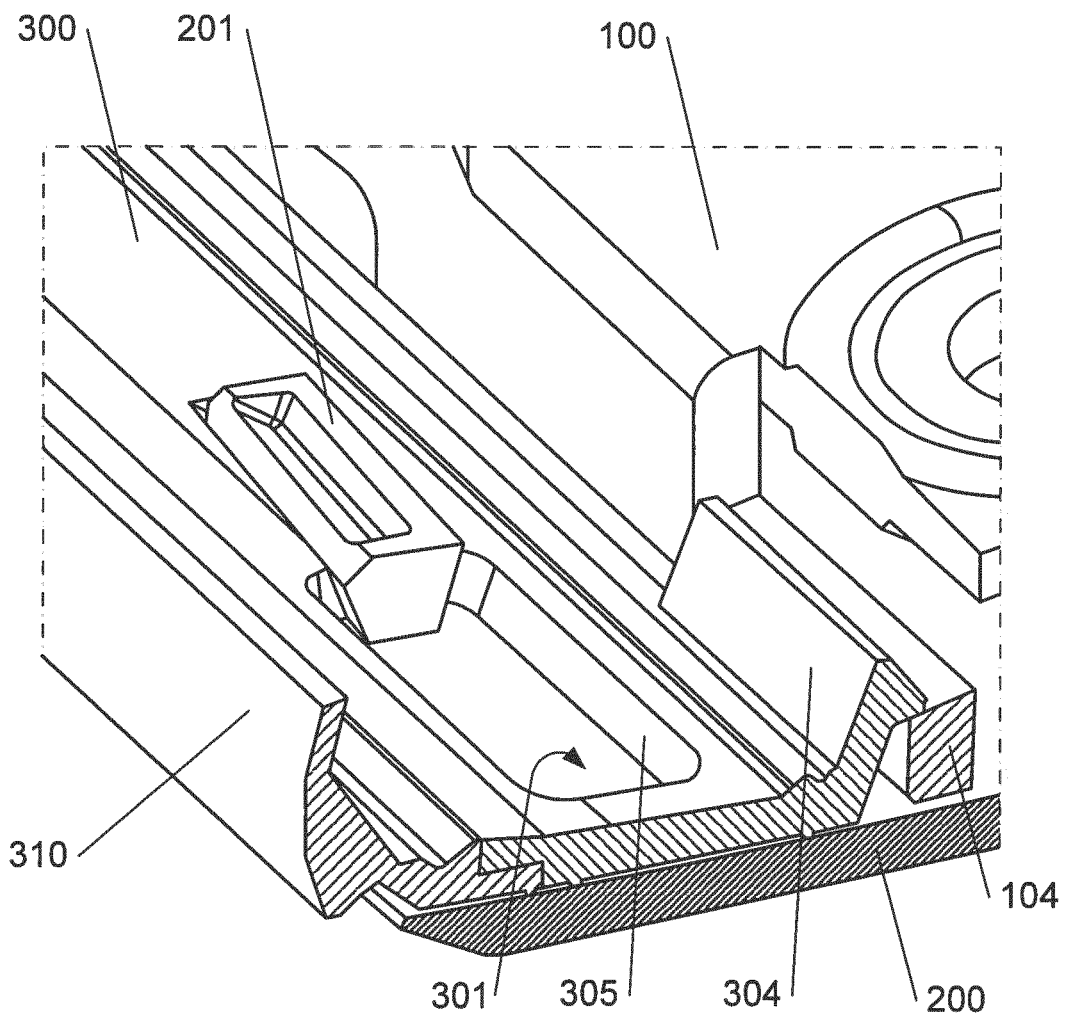

The base part further comprises a number of ridges 104 (see FIG. 11) which are in assembled state engaged by hook-shaped members 304 which are provided on the mounting part 300 and together form the second resilient fixing elements described herein. The ridges are also distributed along the length of the base part 100. It is evident that this construction may be turned around, i.e. with the hook-shaped members on the base part and engaging ridges on the mounting part, and that other second resilient fixing elements are contemplated within the scope of this disclosure.

Figure 4:
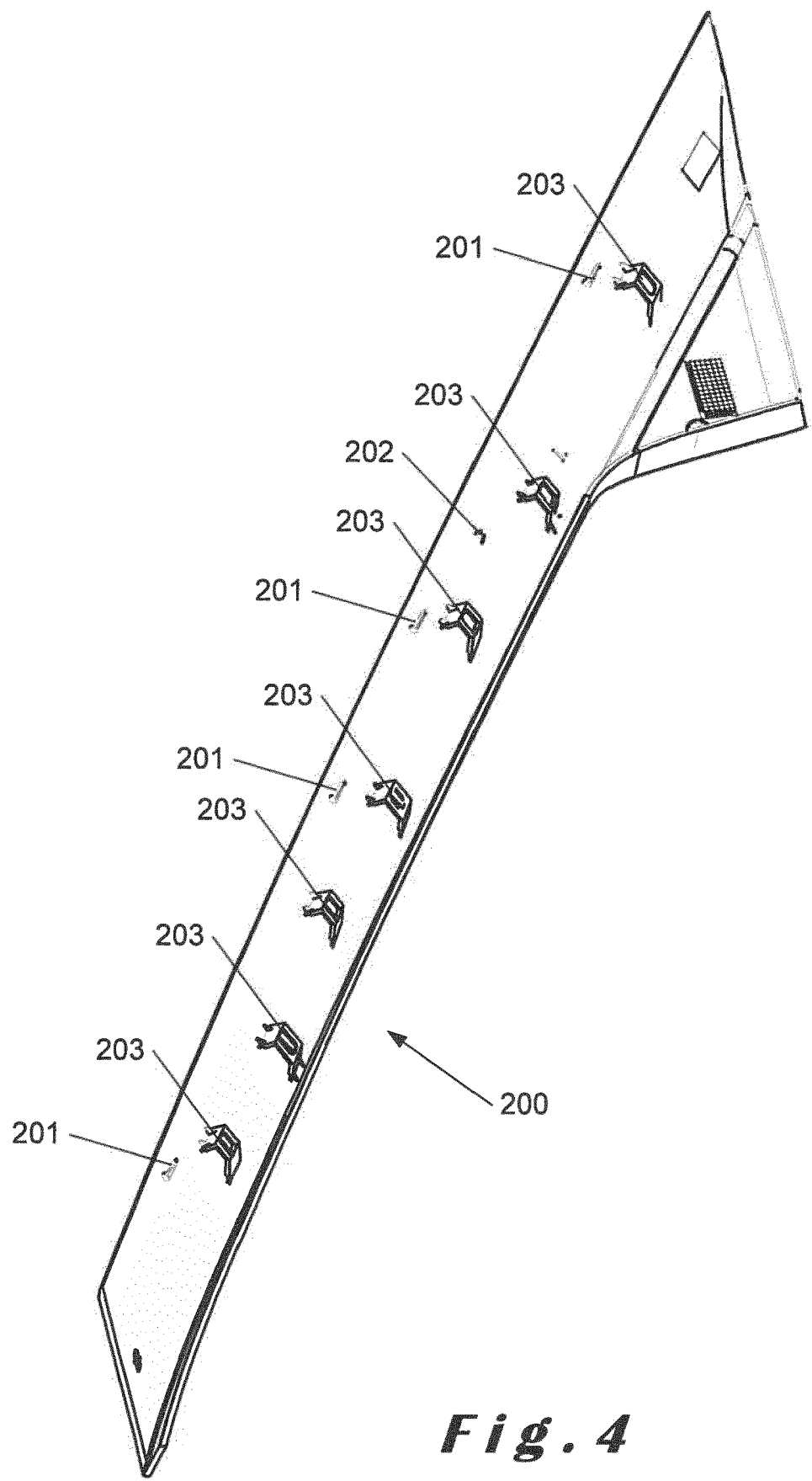
FIG. 4 shows a perspective view of the cover part of the assembly of FIGS. 1 and 2.

The cover part 200, shown in FIG. 4, comprises structures 203 which are provided for receiving the first resilient fixing elements 400 described herein. The cover part 200 further comprises an array of oblong protrusions 201 as part of the sliding fixing elements and another protrusion 202 as part of the interlocking elements described herein.

Figure 5:
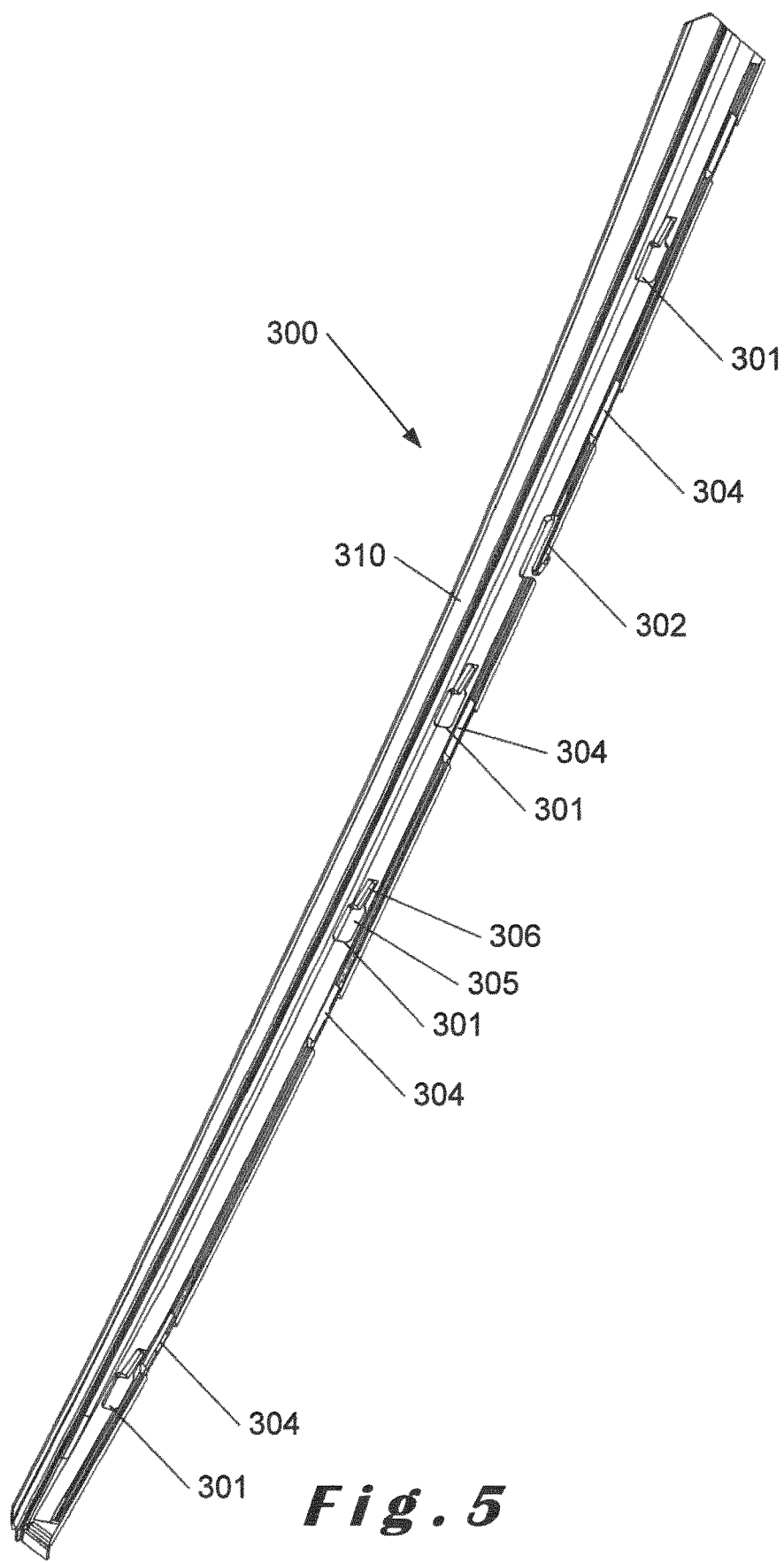
FIG. 5 shows a perspective view of the mounting part with the sealing strip of the assembly of FIGS. 1 and 2.
Figure 7:
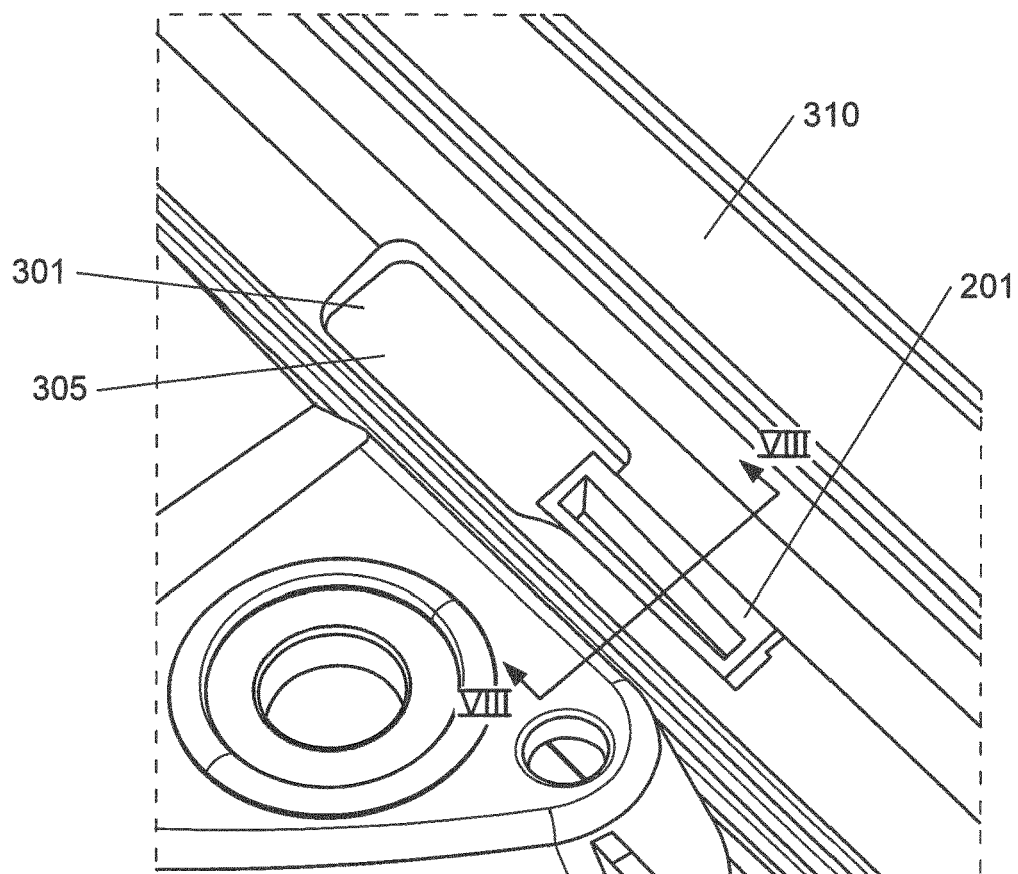
FIGS. 7-11 show details of the assembly of FIGS. 1 and 2.
Figure 8:
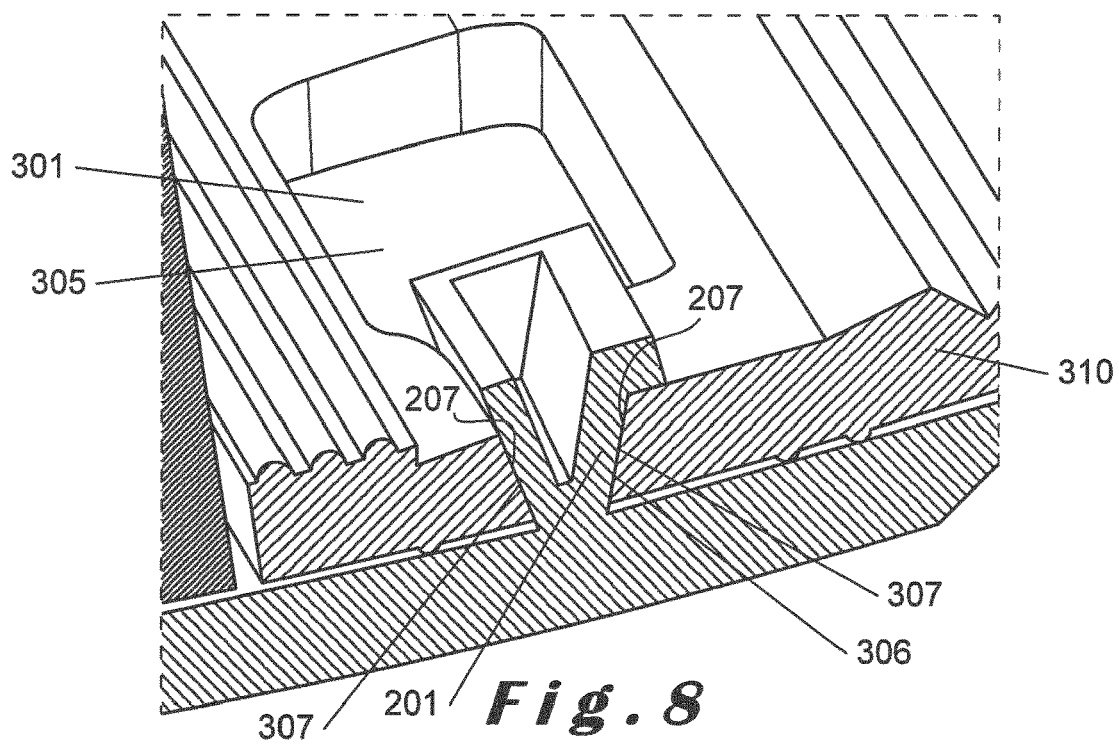

The mounting part 300, shown in FIG. 5, comprises the sealing strip 310 which is moulded onto the mounting part. The mounting part further comprises an array of slotted holes 301 as part of the complementary fixing elements by means of which the mounting part 300 is fixed to the cover part 200. The slotted holes 301 comprise a wide part 305, wide enough for receiving the oblong protrusions 201 of the cover part 200, and a narrower part 306, sized for engaging the oblong protrusions 201. In order to fix the mounting part to the cover part, the protrusions 201 of the cover part are placed in the wider parts 305 of the slotted holes 301 and the mounting part 200 is subsequently longitudinally displaced to slide the protrusions 201 into the narrower parts 306 of the slotted holes 301. The assembled state is shown in the detailed FIGS. 7 and 8. The protrusions 201 and the narrower parts 306 have complementary ridges 207, 307 which are oriented for enabling the sliding movement while engaging behind each other in a direction perpendicular thereto to ensure the fixation, see FIG. 8. The use of, for example, these oblong protrusions 201 together with their positional distribution lengthwise along the cover part has the effect that any gap between the cover part 200 and the mounting part 300 can be minimized. If desired, the fixation may further be enhanced by applying drops of adhesive before placing the mounting part on the cover part. The height of the oblong protrusions 201 is preferably limited, such that they do not protrude above the surface of the mounting part 300 in assembled state. In this way the protrusions do not form any obstruction or hindrance when placing the cover part, mounting part and sealing strip together onto the base part and over the edge of the windscreen. It is evident that other complementary fixing elements, especially sliding fixing elements, are contemplated within the scope of this disclosure for fixing the mounting part onto the cover part.

The mounting part 300 further comprises a resilient member 302 as part of the interlocking elements described herein, together with the protrusion 202 on the cover part 200. The resilient member 302 is provided for being resiliently pushed away by the protrusion upon fixing the mounting part 200 to the cover part 300, i.e. upon the lateral displacement for sliding the oblong protrusions 201 into the narrower parts 306 of the slotted holes 301, until it snaps back into an engaging position in which the resilient member 202 engages behind the protrusion 202 and secures the position of the mounting part 300 on the cover part 200.

Figure 6:
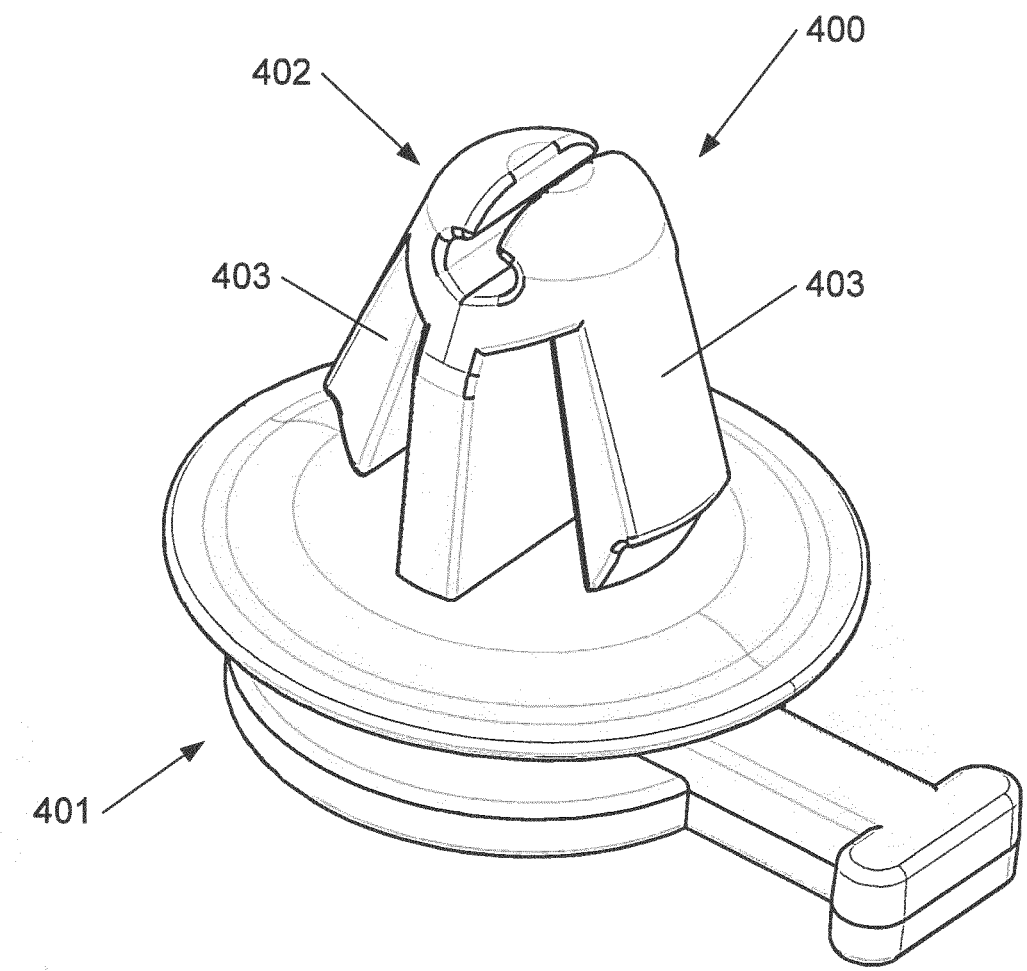
FIG. 6 shows a perspective view of the first resilient fixing elements of the assembly of FIGS. 1 and 2.
Figure 9:
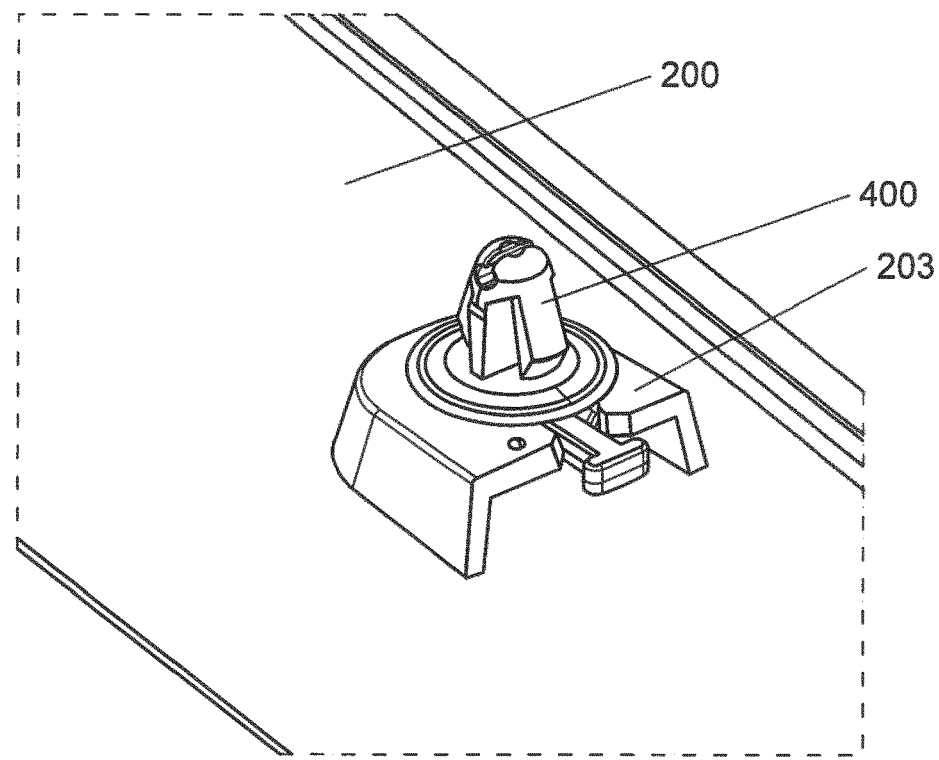
Figure 10:
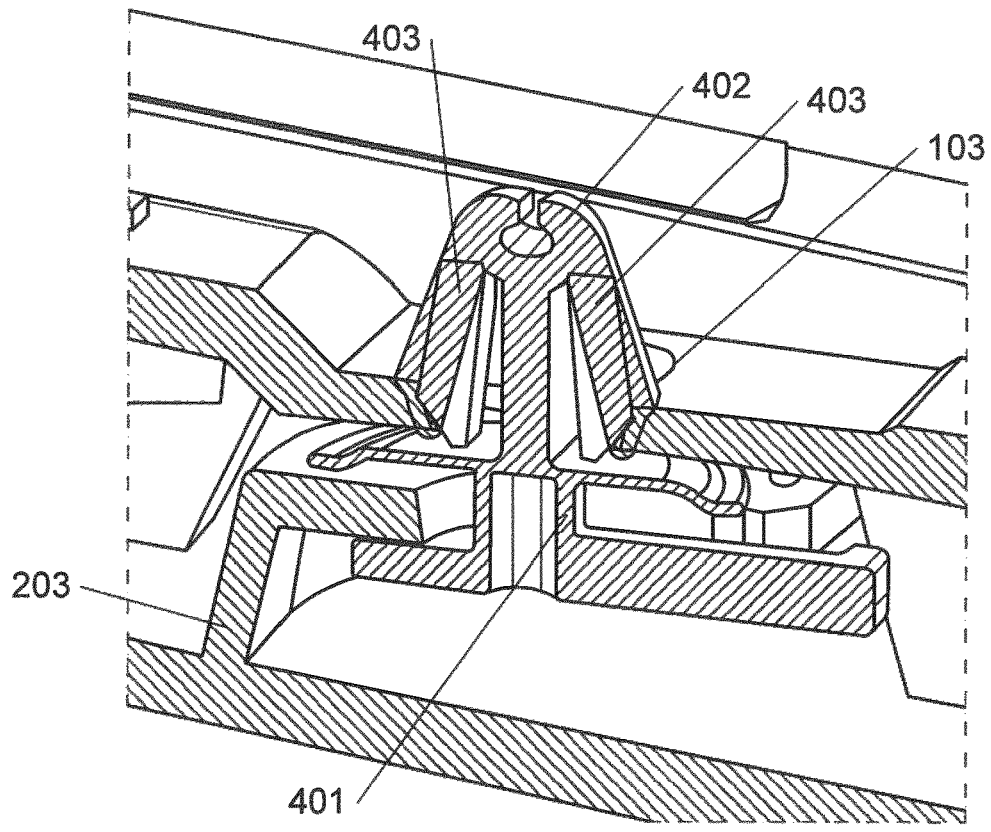

FIG. 6 shows one of an embodiment of the first resilient fixing elements 400 described herein, for fixing the cover part 200 to the base part 100. The first resilient fixing element 400 comprises a bottom part 401 which is provided for being mounted to one of the structures 203 provided on the cover part 200 before assembly, see FIG. 9. These structures 203 are preferably shaped such that the fixing elements 400 can be mounted thereto by means of a lateral displacement, i.e. a displacement substantially parallel to the plane of the cover part 200. The first resilient fixing element 400 further comprises a top part 402 comprising the resilient wings 403 provided to be inserted through the holes 103 in the base part 100. Upon insertion through the holes 103, the wings 403 are resiliently bent inwards until they snap back into an engaging position in which the wings 403 engage behind the material surrounding the holes 103, see FIG. 10. It is evident that the construction may be turned around, i.e. that the base part may be provided with structures for receiving the bottom parts of the first resilient fixing elements and the cover part may be provided with structures for receiving the top parts of the first resilient fixing elements. Furthermore, other first resilient fixing elements are contemplated within the scope of this disclosure. In any case, however, the provision of separate resilient fixing elements is preferred, since this has the effect that these parts can be optimised for their function and/or be interchanged with other first resilient fixing elements with different properties as desired. Further, providing these elements as separate construction parts has the advantage that the manufacturing process of the cover part and the base part by injection moulding can be simplified, since the structure of these parts becomes less complex and they are thus easier to manufacture by means of injection moulding.

The parts of the assembly are preferably manufactured in plastic materials and by injection moulding, although other materials and/or manufacturing processes are not excluded. The base part 100 and the mounting part 300 are preferably manufactured in TPE, with the sealing strip of the mounting part, which is injection-moulded onto the mounting part, being preferably made of a softer TPE, for example with a shore A hardness of 70. The cover part 200 is preferably made of PMMA in view of the glossy appearance of this material.

The invention claimed is:

1. A vehicle window post assembly, comprising:
   a base portion fixed to a vehicle chassis along a side of a window of the vehicle;
   a cover portion fixed to the base portion and configured to cover the base portion; and
   a sealing strip configured to seal a gap between the side of the window and the cover portion,
   wherein the sealing strip is arranged on a mounting portion which is a separate part from the base and cover portions, and wherein the cover portion and the mounting portion together have complementary fixing elements such that the mounting portion is mountable on the cover portion in a position suitable for sealing the gap.

2. The vehicle window post assembly according to claim 1, wherein the complementary fixing elements are formed by an array of fixing elements distributed along the length of the mounting and cover portions.

3. The vehicle window post assembly according to claim 1, wherein the complementary fixing elements are sliding fixing elements fixable to each other by a sliding movement of the mounting portion with respect to the cover portion in a longitudinal direction.

4. The vehicle window post assembly according to claim 3, wherein the sliding fixing elements comprise complementary ridges oriented for enabling the sliding movement while engaging behind each other, in a direction perpendicular thereto, to ensure the fixation.

5. The vehicle window post assembly according to claim 1, wherein the mounting portion and the cover portion together have interlocking elements for securing the fixation of the mounting portion to the cover portion.

6. The vehicle window post assembly according to claim 5, wherein the interlocking elements comprise: a resilient member on one part among the mounting portion and the cover portion; and a protrusion on the other part among the mounting portion and the cover portion, wherein the resilient member is configured to resiliently push away by the protrusion upon fixing the mounting portion to the cover portion until the resilient member snaps back into an engaging position in which the resilient member engages behind the protrusion and secures the position of the mounting portion on the cover portion.

7. The vehicle window post assembly according to claim 1, wherein the sealing strip is molded onto the mounting portion.

8. The vehicle window post assembly according to claim 1, further comprising a first array of first resilient fixing elements which, in assembled state, are configured to engage between the cover portion and the base portion, and a second array of second resilient fixing elements which, in assembled state, are configured to engage between the mounting portion and the base portion.

9. The vehicle window post assembly according to claim 8, wherein the first array of first resilient fixing elements, which fix the cover portion to the base portion, are distributed along the length of the base and cover portions.

10. The vehicle window post assembly according to claim 8, wherein the second array of second resilient fixing elements, which fix the mounting portion to the base portion, are distributed along the length of the base and mounting portions.

11. The vehicle window post assembly according to claim 8, wherein the first resilient fixing elements are separate construction portions which are arranged on the cover portion and have resilient wings for engaging behind parts of the base portion.

12. The vehicle window post assembly according to claim 11, wherein the cover portion comprises an array of structures for receiving the first resilient fixing elements, and wherein the base portion comprises an array of holes through which the resilient wings of the first resilient fixing elements are inserted in assembled state.

13. The vehicle window post assembly according to claim 8, wherein the second resilient fixing elements comprise resilient hook-shaped members on one part among the mounting portion and the base portion, and complementary ridges on the other part among the mounting portion and the base portion, and wherein the hook-shaped members engage behind the complementary ridges in assembled state.

* * * * *